(12) United States Patent
Copenhafer et al.

(10) Patent No.: US 6,576,206 B2
(45) Date of Patent: Jun. 10, 2003

(54) BICARBONATE CONVERSION IN A CARBONATE MONOHYDRATE PROCESS

(75) Inventors: William C. Copenhafer, Yardley, PA (US); Thomas H. Neuman, Salt Lake City, UT (US)

(73) Assignee: FMC Wyoming Corporation, Princeton, NJ (US)

( * ) Notice: Subject to any disclaimer, the term of this patent is extended or adjusted under 35 U.S.C. 154(b) by 0 days.

(21) Appl. No.: 09/880,342

(22) Filed: Jun. 13, 2001

(65) Prior Publication Data

US 2003/0007923 A1 Jan. 9, 2003

(51) Int. Cl.[7] ................................................. C01D 7/12
(52) U.S. Cl. .............................. 423/206.1; 423/206.2; 423/421
(58) Field of Search ............................ 423/206.2, 206.1, 423/421; 23/302 T, 297, 298; 299/4, 5

(56) References Cited

U.S. PATENT DOCUMENTS

| 3,264,057 | A | | 8/1966 | Miller |
| 3,953,073 | A | | 4/1976 | Kube |
| 4,252,781 | A | * | 2/1981 | Fujita et al. ................. 423/195 |
| 4,401,635 | A | | 8/1983 | Frint |
| 5,262,134 | A | | 11/1993 | Frint et al. |
| 5,283,054 | A | | 2/1994 | Copenhafer et al. |
| 5,575,922 | A | | 11/1996 | Green et al. |
| 5,609,838 | A | | 3/1997 | Neuman et al. |
| 5,766,270 | A | | 6/1998 | Neuman et al. |
| 5,955,043 | A | | 9/1999 | Neuman et al. |
| 6,010,672 | A | * | 1/2000 | Turner ..................... 423/206.2 |
| 6,228,335 | B1 | | 5/2001 | Copenhafer et al. |
| 6,251,346 | B1 | | 6/2001 | Neuman et al. |
| 6,322,767 | B1 | | 11/2001 | Neuman et al. |
| 6,428,759 | B1 | * | 8/2002 | Smith et al. ............. 423/206.2 |

* cited by examiner

Primary Examiner—Steven Bos
Assistant Examiner—Anthony Kuhar
(74) Attorney, Agent, or Firm—TraskBritt (57) ABSTRACT

A method for converting sodium bicarbonate in a sodium carbonate monohydrate crystallization process to maintain a mother liquor composition in a sodium carbonate monohydrate crystallizer below the invariant point for the crystallizer for reducing or eliminating the cocrystallization of sodium sesquicarbonate crystals in the process. The mother liquor composition may be maintained below the invariant point by stripping carbon dioxide from a feed solution or from mother liquor recycled to the crystallizer.

18 Claims, 4 Drawing Sheets

BICARBONATE CONVERSION IN A CARBONATE MONOHYDRATE PROCESS

BACKGROUND OF THE INVENTION

1. Field of the Invention

The present invention relates to a process for enhancing the recovery of sodium carbonate monohydrate from soda ash process liquors containing both sodium carbonate and sodium bicarbonate. More specifically, the invention relates to the conversion of sodium bicarbonate to sodium carbonate in a monohydrate production process.

2. State of the Art

Sodium carbonate, also known as soda ash, is one of the highest volume chemicals produced in the United States. The majority of soda ash produced in this country comes from trona or nahcolite ore deposits located primarily in Wyoming, California, and Colorado. The ore is dry mined or solution mined and processed to produce sodium carbonate. Both dry mining and solution mining techniques are well known to those skilled in the art.

A number of production processes have been used to extract sodium carbonate from ores such as trona and nahcolite and, more specifically, from solutions made from these ores. Most of the soda ash production processes in the United States today use a sodium carbonate monohydrate crystallizer as the last crystallization step in the production process. To avoid the unwanted precipitation of sodium sesquicarbonate in a monohydrate crystallizer, commercial processes in use today have preliminary steps designed to reduce the bicarbonate concentration in the feed stream. For example, dry mined ores must be essentially completely calcined to convert sodium bicarbonate to sodium carbonate before dissolving the calcinate and feeding the clarified liquor to a monohydrate crystallization process. In some solution mining processes, even after initially concentrating and $CO_2$ stripping the solution mined brine, intermediate crystallization steps are required to produce a monohydrate crystallizer feed with sufficiently reduced bicarbonate concentration. For example, sodium sesquicarbonate can be crystallized from the $CO_2$-stripped brine to further reduce the sodium bicarbonate concentration. Prior art processes also crystallize sodium carbonate decahydrate crystals from the partially $CO_2$-stripped brine as an intermediate which must be melted prior to the monohydrate crystallization step.

Known sodium carbonate monohydrate crystallization processes used to produce soda ash feed a sodium carbonate and sodium bicarbonate containing solution to a monohydrate crystallizer to crystallize sodium carbonate monohydrate. A slurry of wet crystals and mother liquor forms within the crystallizer. A portion of the slurry is discharged from the monohydrate crystallizer and the wet crystals are separated from the mother liquor. The wet crystals are dried to yield a soda ash product. A portion of the mother liquor separated from the wet crystals is purged from the process and the remainder is recycled back to the monohydrate crystallizer. As known in the art, however, if the sodium bicarbonate concentration of the crystallizer feed solution is not sufficiently reduced, both sodium carbonate monohydrate and undesired sodium sesquicarbonate crystals can form in the monohydrate crystallizer. One such process is described in U.S. Pat. No. 6,228,335. Therefore, in order to guarantee formation of only sodium carbonate monohydrate crystals, other steps, such as intermediate crystallization steps or increasing the purge rate of the crystallizer purge stream are used to control the bicarbonate concentration in the mother liquor.

Unlike sodium carbonate monohydrate crystals, sodium sesquicarbonate crystals are long, thin, needle-like crystals, which are difficult to dewater. In addition, the sodium sesquicarbonate crystals are prone to breakage resulting in an undesirable, dusty soda ash product. The soda ash produced by calcination of sesquicarbonate also has an undesirably low bulk density compared to that made by drying sodium carbonate monohydrate. It is, therefore, preferable to produce only sodium carbonate monohydrate crystals in a sodium carbonate monohydrate crystallization process. An alkali-efficient process of producing sodium carbonate monohydrate crystals in a crystallizer by feeding solutions containing substantial sodium bicarbonate concentrations to a sodium carbonate monohydrate crystallization circuit without the need for intermediate crystallization steps is, therefore, desirable.

SUMMARY OF THE INVENTION

The present invention relates to a process for enhancing the recovery of sodium carbonate monohydrate crystals from solutions containing sodium carbonate and sodium bicarbonate. More specifically, the invention relates to the decomposition of sodium bicarbonate to sodium carbonate in a sodium carbonate monohydrate production process.

In one embodiment of the present invention, a process feed solution containing both sodium carbonate and sodium bicarbonate is subjected to $CO_2$ stripping prior to feeding the stripped solution directly to the sodium carbonate monohydrate crystallizer. The process feed solution of this invention is typically brine recovered from solution mining ores such as nahcolite or trona, sometimes containing minor bicarbonate constituents such as wegscheiderite, and which may have already been concentrated and partially $CO_2$ stripped prior to feeding this process. The process feed solution can also be formed by dissolving dry mined ore in a solution or by blending the dissolved dry mined ore with solution mined brine. Steam being used to strip $CO_2$ from the process feed is desirably the vapors of triple effect crystallizers or those from a crystallizer using mechanical vapor recompression. By $CO_2$ stripping the monohydrate crystallizer circuit feed solution, the yield of sodium carbonate monohydrate is improved and the amount of purge liquor sent to waste is reduced. More importantly, the yield of recovered sodium carbonate monohydrate is increased without cocrystallizing sesquicarbonate by maintaining the mother liquor composition slightly below the carbonate monohydrate/ sesquicarbonate invariant point, and without the use of intermediate crystallization steps.

In a preferred embodiment of the present invention, a process feed solution containing both sodium carbonate and sodium bicarbonate is fed directly to a sodium carbonate monohydrate crystallizer to crystallize sodium carbonate monohydrate crystals. The process feed solution is typically brine recovered from a solution mining process, solution formed by dissolving dry mined ore, or a combination thereof. At least a portion of the mother liquor from the crystallizer is recycled through a $CO_2$ stripping column to decompose some of the sodium bicarbonate in the mother liquor to sodium carbonate. A portion of the stripped mother liquor is returned to the crystallizer. Crystallizer mother liquor feeding the $CO_2$ stripper is typically sourced either directly from an essentially crystal-free zone within the crystallizer body or from any of several solid/liquid separation devices (i.e., centrifuges, filters, cyclones) applied to a carbonate monohydrate slurry withdrawn from the crystallizer and commonly known to those skilled in the art. In order to prevent precipitation of salts from the $CO_2$ stripping operation, it may be necessary to dilute the mother liquor feeding the $CO_2$ stripper.

Stripping column conditions—such as temperature, steam rate, liquor feed rate, and the like—are adjusted to control the amount of decomposition of sodium bicarbonate in the stripped mother liquor. By adjusting the amount of mother liquor sent to the $CO_2$ stripper, a steady state composition within the crystallizer body can be maintained at just below the invariant point corresponding to the cocrystallization of sodium sesquicarbonate and sodium carbonate monohydrate. This guarantees the production of only sodium carbonate monohydrate crystals within the sodium carbonate monohydrate crystallizer.

DESCRIPTION OF THE DRAWINGS

While the specification concludes with claims particularly pointing out and distinctly claiming that which is regarded as the present invention, this invention can be more readily ascertained from the following description of the invention when read in conjunction with the accompanying drawings in which:

DETAILED DESCRIPTION OF THE INVENTION

The present invention involves controlling a sodium bicarbonate concentration within a sodium carbonate monohydrate crystallization process to reduce or eliminate cocrystallization of sodium sesquicarbonate crystals with the desired sodium carbonate monohydrate crystals. To achieve this, a feed solution to a sodium carbonate monohydrate crystallizer circuit, or mother liquor recycled to the sodium carbonate monohydrate crystallizer, is stripped of carbon dioxide. By doing this, the mother liquor concentration of sodium carbonate and sodium bicarbonate in the sodium carbonate monohydrate crystallizer can be controlled at just below an invariant point composition, thereby reducing or eliminating sodium sesquicarbonate cocrystallization, minimizing the amount of purge liquor leaving the system, and yielding a more efficient process.

Figure 1:
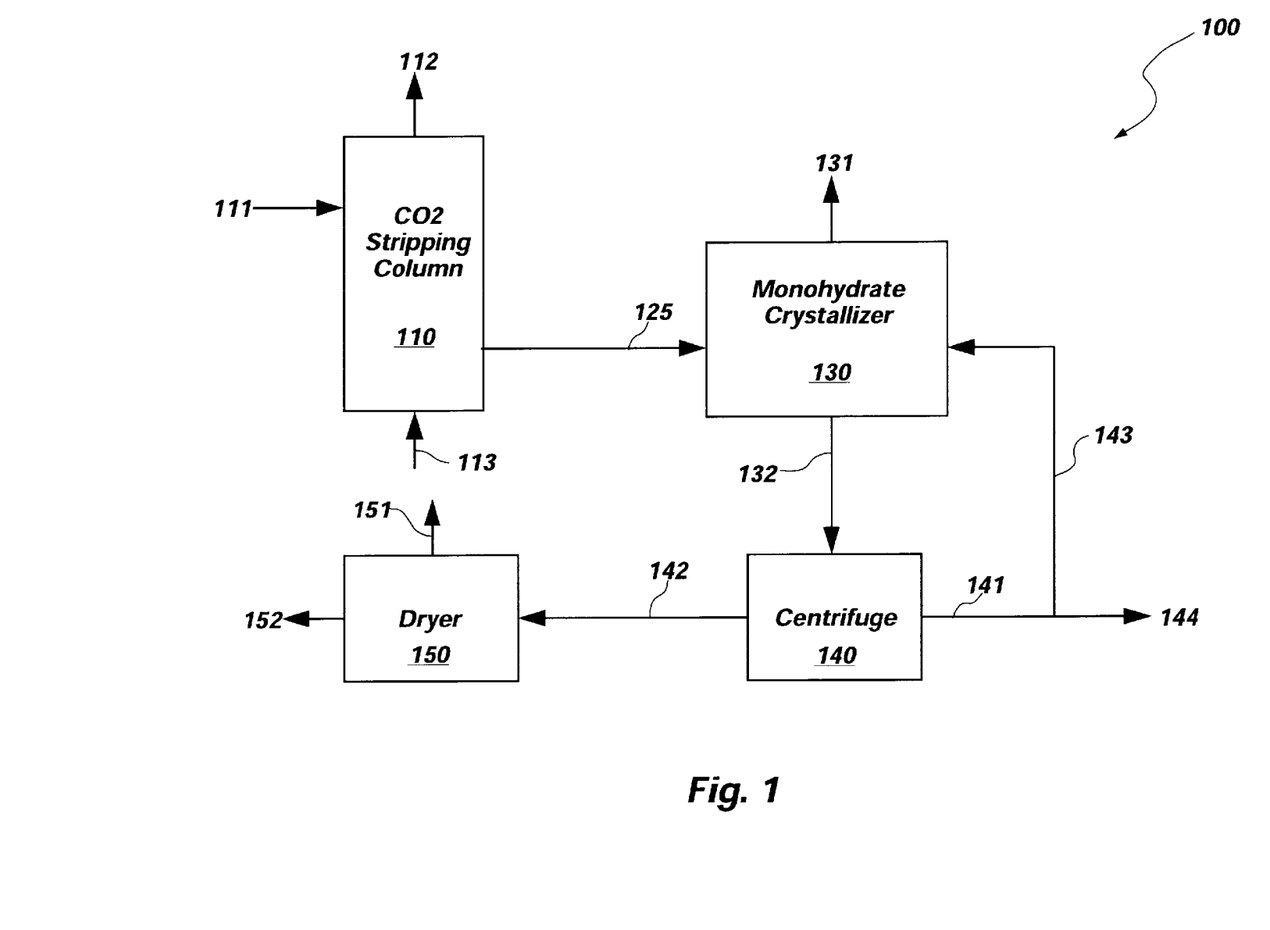
FIG. 1 is a block diagram illustrating an embodiment of the present invention.

One embodiment of the present invention is illustrated in FIG. 1 as process 100. A feed solution 111 containing both sodium carbonate and sodium bicarbonate is introduced to a $CO_2$ stripping column 110 or other stripping device. Feed solution 111 could be, for example, brine derived from solution mining bicarbonate containing ores, such as trona, nahcolite or wegscheiderite. Alternatively, feed solution 111 may be brine derived from dissolving dry mined ore or a brine containing both dry mined ore and solution mined ore. In general, $CO_2$ stripping columns are operated in countercurrent fashion. Feed solution 111 is introduced to the top of stripping column 110 and steam 113 is introduced near the bottom of the stripping column 110. Vapors leave the stripping column 110 as stream 112. Carbon dioxide stripped solution 125 exits the stripping column 110 and is fed to the sodium carbonate monohydrate evaporative crystallizer 130. Evaporated water exits the sodium carbonate monohydrate evaporative crystallizer 130 as vapor stream 131 and sodium carbonate monohydrate slurry 132 is discharged to centrifuge 140. Wet sodium carbonate monohydrate crystals 142 separated from slurry 132 may be dried in dryer 150 to produce anhydrous sodium carbonate 152 which may be sold as soda ash product. Gases produced during the drying process exit the dryer 150 as stream 151. Mother liquor 141 separated from slurry 132 is discharged from the centrifuge 140. A portion of the mother liquor 141 may be purged as purge stream 144, and the remainder may be recycled back to the sodium carbonate monohydrate evaporative crystallizer 130 as recycle stream 143.

Within stripping column 110, steam 113 removes carbon dioxide from feed solution 111, causing the decomposition of sodium bicarbonate in the feed solution 111 to sodium carbonate, water, and carbon dioxide. Steam is expensive, so in order to economically use steam in a stripping operation, it must have a further downstream use. Thus, in most plants, the steam 113 available for stripping is often limited to steam that is involved in the crystallization process. This may include virgin steam (from a boiler, for example), steam from the sodium carbonate monohydrate evaporative crystallizer 130, or steam from the sodium carbonate monohydrate evaporative crystallizer 130 that has been compressed. Preferably, the steam 113 used to strip carbon dioxide from feed solution 111 in the stripping column 110 is steam that is to be condensed to provide heat for evaporation in the crystallizer 130. In other words, the flow rate of steam 113 entering the stripping column 110 is nominally the same as the flow rate of vapor stream 131 exiting the sodium carbonate monohydrate evaporative crystallizer 130. Of course, other sources of steam 113 may be used instead of, or combined with, vapor stream 131, without departing from the scope of this invention.

Figure 2:
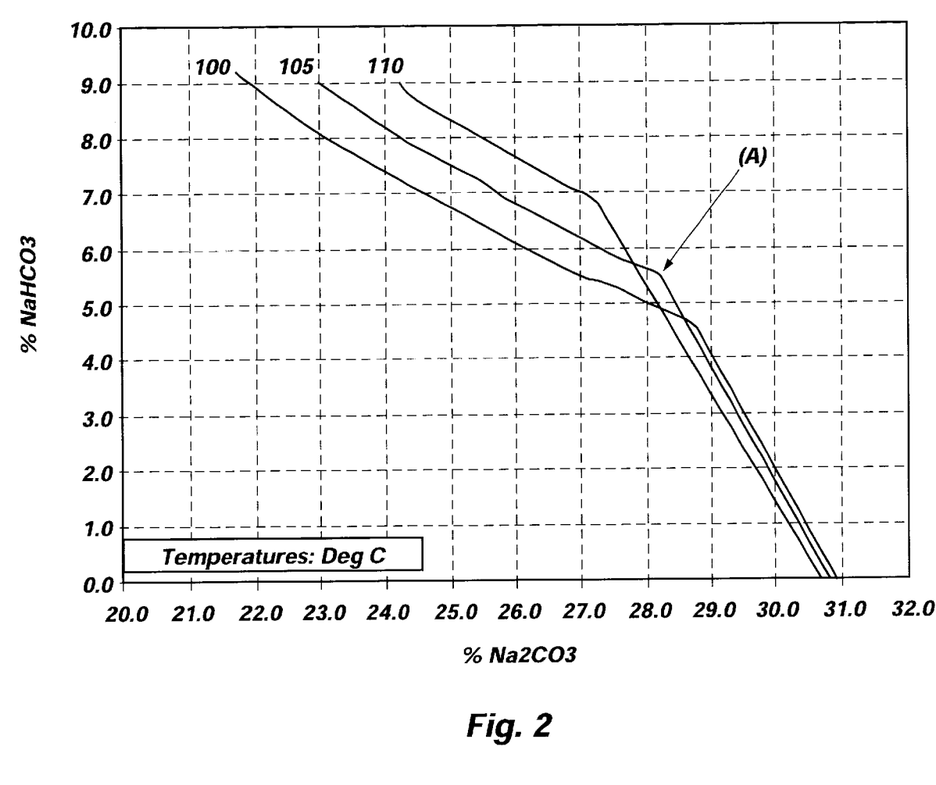
FIG. 2 is a phase diagram for sodium carbonate and sodium bicarbonate in solution.

Illustrated in FIG. 2 is a solubility diagram for a pure sodium carbonate, sodium bicarbonate and water system. Point A on the 105° C. isotherm represents a mother liquor composition at which both sodium carbonate monohydrate crystals and sodium sesquicarbonate crystals will cocrystallize and precipitate from the mother liquor. Point A is referred to as the invariant point composition since evaporation of mother liquor at the invariant point composition yields varying amounts of sodium carbonate monohydrate and sodium sesquicarbonate crystals. For a system containing only sodium carbonate, sodium bicarbonate, and water, the composition of the mother liquor does not change at the invariant point. To reduce or eliminate the cocrystallization of sodium carbonate monohydrate crystals and sodium sesquicarbonate crystals in a sodium carbonate monohydrate evaporative crystallizer, the concentrations of sodium carbonate and sodium bicarbonate in the crystallizer mother liquor must be kept below the invariant point. It is understood by those skilled in the art that the presence of impurities, such as sodium chloride and sodium sulfate, in the mother liquor will alter the solubility diagram by generally depressing the invariant point, thereby further reducing the maximum allowable concentration of sodium bicarbonate in the mother liquor to ensure the reduction or elimination of sodium sesquicarbonate cocrystallization in the sodium carbonate monohydrate evaporative crystallizer.

For a system represented by FIG. 2, point A on the solubility diagram shows that the invariant point composition for a sodium carbonate monohydrate evaporative crystallizer mother liquor at 105° C. occurs at a composition of about 28.2 percent sodium carbonate and about 5.6 percent sodium bicarbonate. Saturated mother liquors on the 105° C. isotherm containing less than about 5.6 percent sodium bicarbonate are in equilibrium with sodium carbonate monohydrate and those containing more than 5.6 percent sodium bicarbonate are in equilibrium with sodium sesquicarbonate. To safely avoid the cocrystallization of sodium sesquicarbonate crystals, one might maintain a mother liquor composition of about 28.5% sodium carbonate and 5.0% sodium bicarbonate in the sodium carbonate monohydrate crystallizer at about 105° C. However, as water is evaporated and crystals form in a sodium carbonate monohydrate crystallizer, the concentration of dissolved sodium bicarbonate in the mother liquor increases. If sodium bicarbonate concentrations are not reduced, the mother liquor concentration may reach the invariant point and sodium sesquicarbonate crystals may begin to cocrystallize. Because evaporative crystallizers are generally not designed to strip carbon dioxide during crystallization, the sodium bicarbonate concentration in the crystallizer mother liquor must be decomposed in other ways.

Most prior art processes reduce the sodium bicarbonate concentration of the mother liquor in a sodium carbonate monohydrate crystallization process by purging the highly concentrated mother liquor or using intermediate crystallization steps. The present invention presents a more efficient process. Stripping carbon dioxide from feed solution 111 yields an enhanced recovery of soda ash and decreases the amount of mother liquor which must be purged from the crystallization process. These advantages are better demonstrated by comparing process operation of a prior art process with the embodiment of the present invention illustrated in FIG. 1 for a given set of process parameters.

Table I compares the operation of the embodiment of the present invention shown in FIG. 1 with operation of a prior art sodium carbonate monohydrate crystallization circuit. It is assumed that 400 tons/hr of solution containing 24.0% sodium carbonate and 2.0% sodium bicarbonate is fed to each process. Using the process of the present invention, feed solution 111 is stripped using the vapors from the sodium carbonate monohydrate crystallizer. In both processes, the composition of the crystallizer mother liquor at 105° C. is maintained at 28.5% sodium carbonate and 5.0% sodium bicarbonate, just below the invariant point. The stripping column is assumed to operate at about 116.6° C. (240° F.). The term "TA" refers to the total alkalinity due to sodium carbonate and sodium bicarbonate, expressed on a sodium carbonate basis:

$$TA = Na_2CO_3 + (53/84)NaHCO_3$$

TABLE I

Comparison of Processes Illustrating the Benefits of $CO_2$ Stripping the Monohydrate Crystallizer Feed Reference: Figure 1 Process 100 Stream No.

| | 111 | 125 | 144 | 152 | Prior Art Process | | |
|---|---|---|---|---|---|---|---|
| | | | | Stream ID | | | |
| | Brine Feed | Crystal-lizer Feed | Purge | Product Soda Ash | Brine Feed = Crystal-lizer Feed | Purge | Product Soda Ash |
| Total (tph) | 400.0 | 399.4 | 110.7 | 66.0 | 400.0 | 157.2 | 51.3 |
| $Na_2CO_3$ (tph) | 96.0 | 97.4 | 31.5 | 66.0 | 96.0 | 44.7 | 51.3 |
| $NaHCO_3$ (tph) | 8.0 | 5.7 | 5.5 | 0.0 | 8.0 | 7.9 | 0.0 |

TABLE I-continued

Comparison of Processes Illustrating the Benefits of $CO_2$ Stripping the Monohydrate Crystallizer Feed Reference: Figure 1 Process 100 Stream No.

| | 111 | 125 | 144 | 152 | Prior Art Process | | |
|---|---|---|---|---|---|---|---|
| | | | | Stream ID | | | |
| | Brine Feed | Crystal-lizer Feed | Purge | Product Soda Ash | Brine Feed = Crystal-lizer Feed | Purge | Product Soda Ash |
| TA (tph) | 101.0 | 101.0 | 35.0 | 66.0 | 101.0 | 49.7 | 51.3 |
| % $Na_2CO_3$ | 24.0 | 24.4 | 28.5 | 100 | 24.0 | 28.5 | |
| % $NaHCO_3$ | 2.0 | 1.4 | 5.0 | 0 | 2.0 | 5.0 | |
| | | 65.3 Percent TA Recovered | | | | 50.8 Percent TA Recovered | |

The data of Table I illustrate the advantages of using sodium carbonate monohydrate crystallization process 100 of the present invention over the processes of the prior art. Stripping the monohydrate crystallizer feed solution 111 yields an enhanced recovery of soda ash and generates less purge than the prior art sodium carbonate monohydrate crystallizer circuit. In addition, the total alkalinity, TA, recovered from the feed solution 111 is greater using the process of the present invention. Therefore, the sodium carbonate monohydrate crystallization process 100 of the present invention provides numerous advantages over the prior art.

Under steady state conditions, the driving force for volatilizing carbon dioxide from an aqueous solution of sodium carbonate and sodium bicarbonate is governed by the difference between the actual vapor pressure of carbon dioxide and the equilibrium vapor pressure of carbon dioxide above the solution, which is the maximum achievable concentration in the gas phase. As the actual carbon dioxide vapor pressure approaches the equilibrium carbon dioxide vapor pressure, the driving force for carbon dioxide removal is reduced. Removal of carbon dioxide gas decomposes sodium bicarbonate, forming sodium carbonate according to the following reaction:

$$2NaHCO_3 = Na_2CO_3 + CO_2 + H_2O$$

In general, forced circulation crystallizers, commonly used for evaporative crystallization of sodium carbonate monohydrate, are not designed to promote the separation and release of large quantities of gas such as carbon dioxide. Poor mass transfer of the gas from the solution into the vapor phase in a crystallizer may slow down the decomposition rate of sodium bicarbonate to sodium carbonate. As more sodium bicarbonate is decomposed to sodium carbonate, the equilibrium carbon dioxide partial pressure above the generated solution decreases, making removal of additional carbon dioxide from the solution increasingly difficult at lower sodium bicarbonate values. Therefore, $CO_2$ stripping is most efficient when the sodium bicarbonate to sodium carbonate ratio is the highest.

Assuming that purge rates will not be increased beyond the requirements set by other impurities, it is possible to calculate the amount of sodium bicarbonate decomposition within a monohydrate crystallizer circuit required to avoid sodium sesquicarbonate formation for a given set of feed conditions. The first step is to determine the number of cycles of concentration to be achieved in the crystallizer. This calculation is familiar to those skilled in the art and is based on the product quality requirements and the concentration of impurities in the feed solution. This value is then used in the following formula to determine the required sodium bicarbonate decomposition rate needed to avoid cocrystallization of sodium sesquicarbonate.

$$D=F*B*(B*C-E)/(100*B*C)$$

Where:
D=Bicarbonate Decomposition (tph)
F=Feed flow rate (tph)
B=Sodium bicarbonate concentration in the feed (%)
C=Number of cycles of concentration
E=Sodium bicarbonate concentration at the invariant point for the mother liquor (%)

Table II shows the sodium bicarbonate decomposition rates required in a monohydrate crystallizer system if twenty cycles of concentration are desired for a TA-efficient process. The data in Table II reflect a process where only the evaporated carbonate monohydrate crystallizer vapors are used as $CO_2$ stripping steam, 400 tph (about 1,240 gpm) of solution feeds the process, and no decomposition occurs within the crystallizer, although some may occur in actual practice. Decomposition data for feed solutions having a sodium carbonate concentration of 24% and sodium bicarbonate concentrations of 1%, 2%, or 3% are listed in Table II. Such sodium bicarbonate concentrations are representative of those that might be produced by concentrating and stripping brines originating from a trona or nahcolite solution mining operation using technology well known to those skilled in the art. In fact, those skilled in the art will recognize that producing feed solutions with as little as 1% sodium bicarbonate is rather unlikely, but the data is included to further demonstrate the utility of the present invention. Table II also shows the amount of sodium bicarbonate decomposition achieved by stripping the given crystallizer feed solutions using process 100 of the present invention.

TABLE II

Comparison of Required and Achievable Amounts of Bicarbonate Decomposition

| $CO_2$ Stripper Feed % $NaHCO_3$ | Bicarbonate Decomposition Required (tph $NaHCO_3$) | Bicarbonate Decomposition Achieved by Stripping Solution Before Crystallization (tph $NaHCO_3$) |
|---|---|---|
| 1.0 | 3.00 | 0.92 |
| 2.0 | 7.00 | 2.29 |
| 3.0 | 11.00 | 4.00 |

The data in Table II show that stripping carbon dioxide from the feed solution 111, as in process 100, decomposes some of the sodium bicarbonate in the crystallization system. This is an advantage over the prior art where additional purge is used to remove the sodium bicarbonate from the system. Although process 100 decomposes more sodium bicarbonate within the system than prior art processes, stripping carbon dioxide from the feed solution 111 may still require a significant amount of purge or caustic addition to decompose the remaining sodium bicarbonate necessary to maintain mother liquor concentrations below the invariant point for the sodium carbonate monohydrate crystallizer system.

In a preferred embodiment of the present invention, the sodium bicarbonate concentration of the mother liquor in a sodium carbonate monohydrate crystallizer is maintained by recycling a portion of the mother liquor from the sodium carbonate monohydrate crystallizer through a $CO_2$ stripping column or other stripping device. Recycling stripped mother liquor to the sodium carbonate monohydrate crystallizer maintains the sodium bicarbonate concentration within the crystallizer below the invariant point such that cocrystallization of sodium sesquicarbonate is avoided. The degree of bicarbonate decomposition required to maintain a desired sodium bicarbonate concentration in the sodium carbonate monohydrate crystallizer depends on a number of factors, and varies with specific process conditions.

Figure 3:
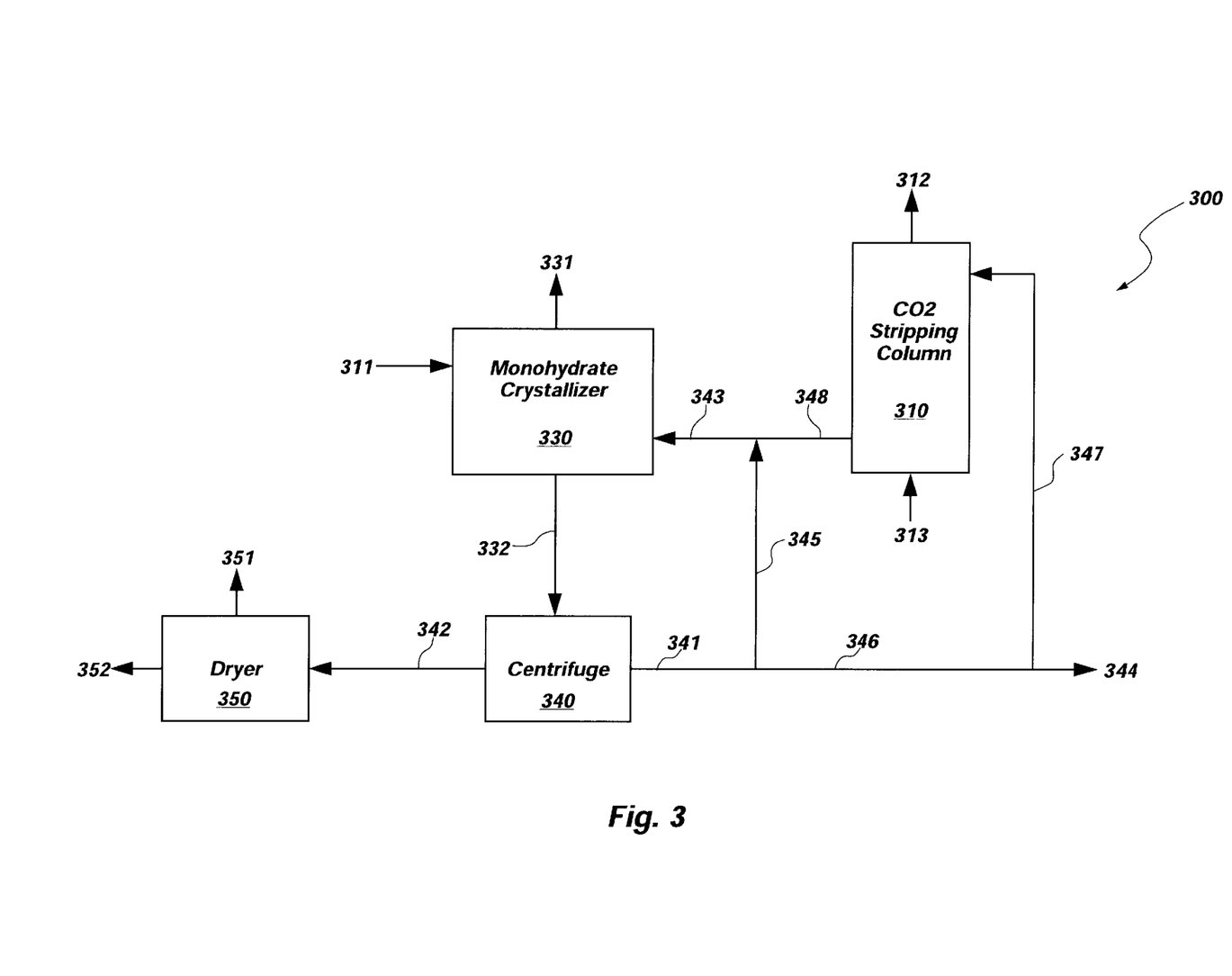
FIG. 3 is a block diagram illustrating a preferred embodiment of the present invention.

An example of a preferred sodium carbonate monohydrate crystallization process 300 of the present invention is illustrated in FIG. 3. A feed solution 311 comprising both sodium carbonate and sodium bicarbonate is introduced to a sodium carbonate monohydrate crystallizer 330. A recycled liquor 343 containing sodium carbonate and sodium bicarbonate is also introduced to the sodium carbonate monohydrate crystallizer 330. Sodium carbonate monohydrate crystals are precipitated from saturated mother liquor in the sodium carbonate monohydrate crystallizer 330. A slurry 332 of sodium carbonate monohydrate crystals and mother liquor removed from the sodium carbonate monohydrate crystallizer 330 is centrifuged in centrifuge 340 to separate the slurry 332 into wet sodium carbonate monohydrate crystals 342 and mother liquor 341. Wet sodium carbonate monohydrate crystals 342 may be dehydrated in dryer 350 to produce soda ash product 352. Gases produced during the drying process exit the dryer 350 as stream 351.

The mother liquor 341 from centrifuge 340, or other crystal separation process, may be split into numerous mother liquor streams. For example, an unstripped mother liquor 345 may be separated from mother liquor 341 and introduced back into the sodium carbonate monohydrate crystallizer 330. At least a portion of the mother liquor 346, rich in sodium bicarbonate, may be purged as stream 344. Recycled mother liquor 347 is introduced to $CO_2$ stripping column 310 where it is stripped to decompose a portion of the sodium bicarbonate of the mother liquor 347 to sodium carbonate, water and carbon dioxide. Vapors leave the stripping column 310 as stream 312. The stripped liquor 348 is recycled to the monohydrate crystallizer 330. Stripped liquor 348, along with any unstripped mother liquor 345, is introduced to the sodium carbonate monohydrate crystallizer 330 as recycled liquor 343.

In the preferred sodium carbonate monohydrate crystallization process 300, feed solution 311 is a brine solution. More particularly, feed solution 311 is a brine recovered by solution mining trona, nahcolite, or some other bicarbonate-containing ore body. Alternatively, feed solution 311 is brine formed by dissolving dry mined trona, nahcolite, or other bicarbonate-containing ore in solution. A combination of solution mined brine and brine formed from dry mined ore may also be used as feed solution 311. The feed solution 311 may have already been treated via evaporation and $CO_2$ stripping steps prior to its being introduced to process 300.

In addition to centrifugation, wet sodium carbonate monohydrate crystals 342 and mother liquor 341 may be separated from slurry 332 by other methods commonly used to separate crystals from slurries. For example, slurry 332 may be filtered, or washed and filtered, using known methods, thereby separating wet sodium carbonate monohydrate crystals 342 and mother liquor 341. Most of the wash water or solution used in such a filtration process may be removed with mother liquor 341.

Recycled mother liquor 347 sent to the $CO_2$ stripping column 310 may be taken from any of several convenient places from the process 300 as well known to those skilled in the art. For example, mother liquor 347 may be withdrawn from a zone within the crystallizer essentially free of crystals and fed to the stripping column 310. Often, slurry 332 from the sodium carbonate monohydrate crystallizer 330 is passed through cyclones (not shown) before separating the crystals to remove mother liquor. Mother liquor from the cyclones may also be sent to the stripping column 310.

Preferably, steam 313 used to strip mother liquor 347 in stripping column 310 is steam 331 from the sodium carbonate monohydrate crystallizer 330. Although other steam sources may be used, such as virgin boiler steam or evaporator steam, an economic advantage is realized by using the sodium carbonate monohydrate crystallizer 330 steam 331 to strip mother liquor 347.

Table III shows the amount of sodium bicarbonate decomposition expected from commercial stripping columns for several mother liquor flow rates. Assuming that a sodium carbonate monohydrate crystallizer 330 operating at just below the invariant point (at about 105° C.) has a mother liquor composition of about 28.5% sodium carbonate and 5.0% sodium bicarbonate, a stripping column 310 operating at about 115.5° C. (240° F.) using only steam 331 will decompose the amount of sodium bicarbonate listed in Table III. The data in Table III indicate that as the flow rate of the mother liquor 347 to the stripping column 310 increases, the sodium bicarbonate concentration of the stripped mother liquor 348 increases. However, the total amount of sodium bicarbonate decomposed by the stripping column 310 increases as the mother liquor 347 flow rate increases. Thus, the amount of sodium bicarbonate decomposition in the entire process may be controlled by varying the flow rate of mother liquor 347 to the stripping column 310.

TABLE III $CO_2$ Stripping of Crystallizer Mother Liquor at 5.0% $NaHCO_3$ Using Steam

| Crystallizer Mother Liquor Flow (gpm) | Stripper Exit Bicarbonate Concentration (%) | Bicarbonate Decomposition (tph) |
|---|---|---|
| 100 | 0.84 | 1.35 |
| 200 | 1.48 | 2.29 |
| 500 | 2.43 | 4.18 |
| 1,000 | 3.11 | 6.14 |
| 5,000 | 4.20 | 12.99 |

Referring to Tables II and III, it can be seen that the present invention is capable of decomposing the required amounts of sodium bicarbonate to maintain the mother liquor concentration in the sodium carbonate monohydrate crystallizer below the invariant point. For example, Table III shows that stripping only 200 gpm of mother liquor (at 5.0% sodium bicarbonate) decomposes 2.29 tph of sodium bicarbonate and stripping 500 gpm of mother liquor decomposes 4.18 tph of sodium bicarbonate. According to Table II, feeding a sodium carbonate monohydrate crystallizer a solution containing 24% sodium carbonate and 1.0% sodium bicarbonate requires at least 3.00 tph of sodium bicarbonate decomposition to avoid sodium sesquicarbonate cocrystallization in the sodium carbonate monohydrate crystallization process. Process 300 can achieve the required decomposition by stripping mother liquor 347 and recycling the stripped mother liquor 348 to the sodium carbonate monohydrate crystallizer 330. As Table III indicates, stripping between 200 and 500 gpm of mother liquor 347, having a sodium bicarbonate concentration of 5.0%, decomposes enough sodium bicarbonate to avoid cocrystallization of sodium sesquicarbonate with a feed solution 311 containing 24% sodium carbonate and 1% sodium bicarbonate being fed to process 300. Similarly, by feeding the stripping column a little more than 1,000 gpm of mother liquor 347, a feed solution 311 containing 2% sodium bicarbonate could be processed without cocrystallizing sodium sesquicarbonate in the sodium carbonate monohydrate crystallizer. Furthermore, stripping mother liquor 347 at a flow rate of 5,000 gpm allows a feed solution containing more than 3% sodium bicarbonate to be introduced to the process 300.

An additional benefit of process 300 of the present invention is the ability to achieve the sodium bicarbonate decomposition required to prevent cocrystallization without using expensive alternative process steps such as caustic addition, or intermediate crystallization processes. By $CO_2$ stripping crystallizer mother liquor, the amount of mother liquor purged can be substantially reduced, resulting in higher overall process TA efficiencies. Because mother liquor is recycled to the sodium carbonate monohydrate crystallizer, soluble impurities are concentrated in the crystallization circuit. To achieve an acceptable soda ash product quality required in the industry, it eventually becomes necessary to remove the impurities in the mother liquor. Typically, when feeding nearly saturated solutions to a sodium carbonate monohydrate crystallizer, the purge stream is adjusted so that the impurities in the crystallizer mother liquor are concentrated to about 15 to 25 times the levels found in the crystallizer feed solution. The ratio of the concentration of an inert impurity in the mother liquor to the concentration in the feed solution provides an estimate of the number of cycles of concentration. Typically, sodium carbonate monohydrate crystallizers are operated with 15 to 25 cycles of concentration. This results in process TA losses of about 4% to 7% with the purge stream. Purge rates are not usually determined by sodium bicarbonate considerations, but instead are controlled by concerns about other impurities such as chloride, sulfate, or organic materials. It is advantageous, therefore, to keep the purge stream as small as possible, while maintaining product quality. This can be accomplished using the present invention.

An additional advantage to using the sodium carbonate monohydrate crystallization process 300 of the present invention is the improvement in the stripping efficiency. The stripping efficiency improvements enable a sodium carbonate monohydrate crystallizer to be operated without cocrystallization of sodium sesquicarbonate; instead, only sodium carbonate monohydrate crystals are crystallized within the sodium carbonate monohydrate crystallizer. The stripping efficiency advantages of a preferred embodiment of the present invention are illustrated in Table IV. The same process feed brine as that used in the prior examples is again assumed in this example: 400 tons/hr of solution containing 24.0% sodium carbonate and 2.0% sodium bicarbonate. The composition of the crystallizer mother liquor at 105° C. is fixed at 28.5% sodium carbonate and 5.0% sodium bicarbonate, just below the monohydrate/sesquicarbonate invariant point. The stripping column is assumed to operate at about 116.6° C. (240° F.), and steam usage is limited to only that from the sodium carbonate monohydrate evaporative crystallizer. Unstripped mother liquor 345 is assumed equal to zero so that stripped liquor 348 is the same as recycle liquor 343. Except for purge stream 344 and the mother liquor associated with wet sodium carbonate monohydrate crystals 342, it is assumed that the rest of the mother liquor is recycled to the $CO_2$ stripping column.

TABLE IV

Process Summary Balance Showing the Benefits of
Stripping Carbonate Monohydrate Crystallizer Mother Liquor Reference: FIG. 3   Process 300
Stream No.

| | 311 | 347 | 348 | 344 | 352 |
|---|---|---|---|---|---|
| | | | Stream ID | | |
| | Crystallizer Feed Brine Solution | Stripping Column Feed | Stripping Column Feed Discharge To Crystallizer | Purge | Product Soda Ash |
| Total (tph) | 400.0 | 397.0 | 395.2 | 14.8 | 96.4 |
| $Na_2CO_3$ (tph) | 96.0 | 113.2 | 117.6 | 4.2 | 96.4 |
| $NaHCO_3$ (tph) | 8.0 | 19.8 | 12.8 | 0.7 | 0.0 |
| TA (tph) | 101.0 | 125.7 | 125.7 | 4.6 | 96.4 |
| % $Na_2CO_3$ | 24.0 | 28.5 | 29.8 | 28.5 | 100 |
| % $NaHCO_3$ | 2.0 | 5.0 | 3.25 | 5.0 | 0 |
| | | | 95.4 Percent TA Recovered | | |

Because the ratio of sodium bicarbonate to sodium carbonate in the crystallizer mother liquor is about twice that of the feed solution 311, the degree of bicarbonate decomposition and $CO_2$ removal is improved and has a dramatic effect on the overall process. Over ninety-five percent of the alkali in the process feed solution 311 is recovered as product, and the amount of purged liquor is significantly reduced to only 14.8 tph. In comparison to the process data illustrated in Table I, the TA recovery is significantly improved and the required purge is significantly reduced using process 300 of the present invention.

Figure 4:
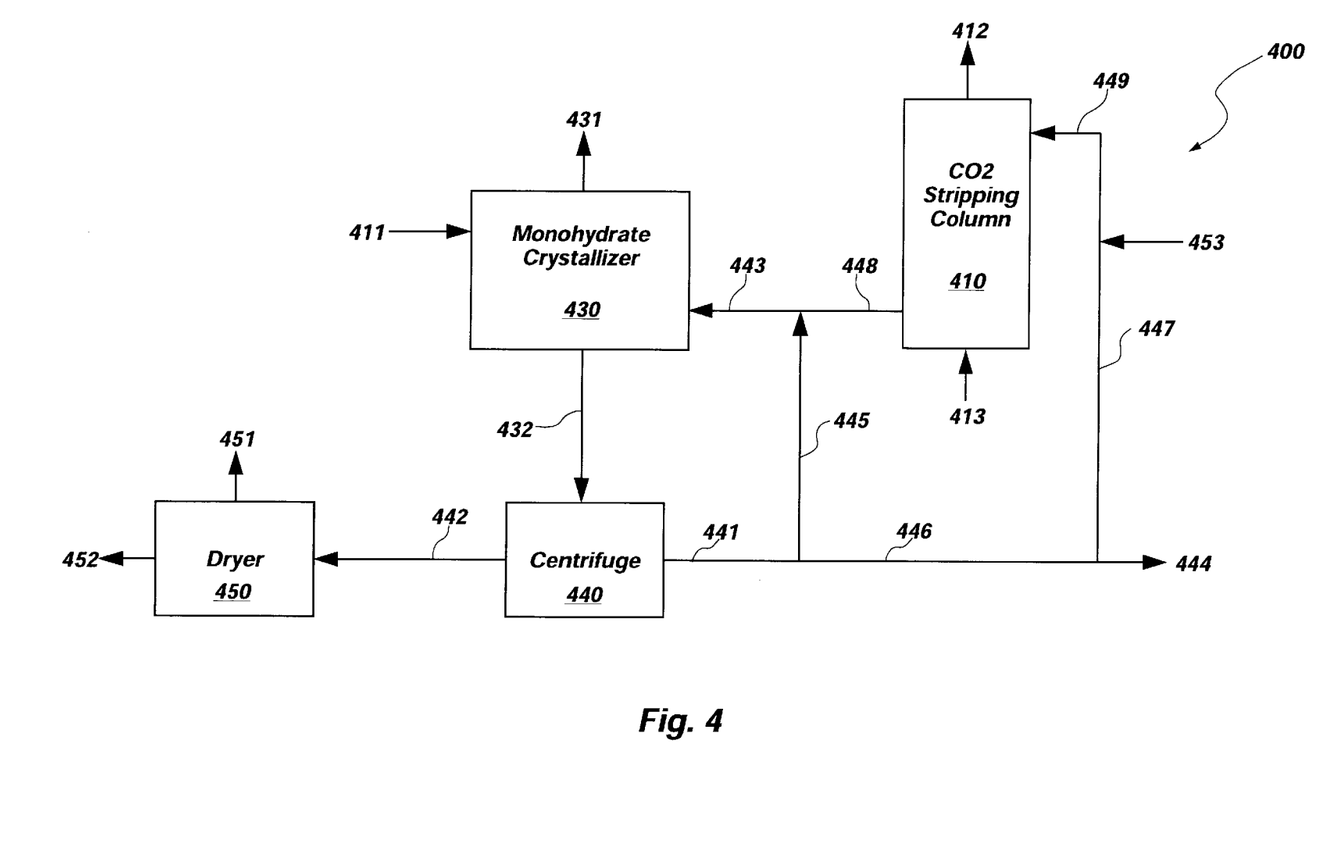
FIG. 4 is a block diagram illustrating an alternate embodiment of the present invention.

In another preferred embodiment of the present invention, crystallizer mother liquor is diluted prior to any $CO_2$ stripping. Usually, monohydrate crystallizer mother liquor must be heated up to the stripping column temperature to facilitate gas removal. To avoid crystallization during the reheating or $CO_2$ stripping, some dilution may be required. A process including dilution is illustrated in FIG. 4 as process 400. A feed solution 411 comprising both sodium carbonate and sodium bicarbonate is introduced to a sodium carbonate monohydrate crystallizer 430. A recycled liquor 443 containing sodium carbonate and sodium bicarbonate may also be introduced to the sodium carbonate monohydrate crystallizer 430. Steam exits the sodium carbonate monohydrate crystallizer 430 as stream 431. Sodium carbonate monohydrate crystals are precipitated from saturated mother liquor in the sodium carbonate monohydrate crystallizer 430. A slurry 432 of sodium carbonate monohydrate crystals and mother liquor removed from the sodium carbonate monohydrate crystallizer is centrifuged in centrifuge 440 to separate the slurry 432 into wet sodium carbonate monohydrate crystals 442 and mother liquor 441. Other crystal separation methods as known in the art may also be used to separate the wet sodium carbonate monohydrate crystals 442 from mother liquor 441. Wet sodium carbonate monohydrate crystals 442 may be dehydrated in dryer 450 to produce soda ash product 452. Gases produced during the drying process exit the dryer 450 as stream 451.

As with process 300, the mother liquor 441 in process 400 may be split into numerous streams. At least a portion of the mother liquor 446, rich in sodium bicarbonate, is purged as stream 444, and the rest of the mother liquor 447 is diluted with stream 453 and introduced to $CO_2$ stripping column 410 as stream 449 where it is stripped to decompose a portion of the sodium bicarbonate of the mother liquor 447 to sodium carbonate, water and carbon dioxide. Steam is introduced to the stripping column 410 as stream 413 and stripped vapors leave stripping column 410 as stream 412. At least a portion of the stripped liquor 448 is recycled to the sodium carbonate monohydrate crystallizer 430 along with any unstripped mother liquor 445.

Dilution stream 453 can be from any number of sources as is well known to those skilled in the art. Preferably, a portion of the feed solution 411 from a solution mining operation is conveniently used to dilute the recycled mother liquor 447. This minimizes the addition of any extra water which must ultimately be removed from the process. However, other dilution streams 453 may include fresh water, wash water from the centrifuge 440, or other crystal separation process, or other dilute waste streams commonly associated with sodium carbonate monohydrate soda ash plants.

Unless otherwise indicated, all percentages are in weight percent and all temperatures are in degrees Celsius. Having thus described certain preferred embodiments of the present invention, it is to be understood that the invention defined by the appended claims is not to be limited by particular details set forth in the above description, as many apparent variations thereof are possible without departing from the spirit or scope thereof as hereinafter claimed.

What is claimed is:

1. A process for producing sodium carbonate monohydrate crystals, comprising:

feeding an aqueous feed solution containing at least sodium bicarbonate to a sodium carbonate monohydrate crystallizer;

evaporating water from the aqueous feed solution to produce a slurry comprising sodium carbonate monohydrate crystals and a mother liquor having dissolved therein at least sodium bicarbonate;

stripping carbon dioxide from at least a portion of the mother liquor which has been diluted with an aqueous diluent to form a diluted mother liquor to convert at least a portion of the sodium bicarbonate dissolved therein to sodium carbonate; and recycling a portion of the stripped diluted mother liquor containing at least dissolved sodium carbonate to the sodium carbonate monohydrate crystallizer.

2. The process of claim 1, wherein the aqueous feed solution comprises a solution derived from a bicarbonate containing ore.

3. The process of claim 2, wherein the bicarbonate containing ore is selected from the group of trona ore, nahcolite ore, and wegscheiderite ore.

4. The process of claim 1, wherein evaporating water from the aqueous feed solution to produce a slurry comprising sodium carbonate monohydrate crystals and a mother liquor comprises evaporating a sufficient amount of water to precipitate sodium carbonate monohydrate crystals and produce a mother liquor having a sodium bicarbonate concentration no greater than that of an invariant point for the process.

5. The process of claim 1, wherein stripping carbon dioxide from the diluted mother liquor comprises:

feeding the diluted mother liquor to a countercurrent stripping column; and stripping carbon dioxide from the diluted mother liquor in the countercurrent stripping column.

6. The process of claim 1, wherein stripping carbon dioxide from at least a portion of the mother liquor comprises stripping a sufficient amount of carbon dioxide from the diluted mother liquor to decompose a sufficient amount of sodium bicarbonate from the diluted mother liquor to maintain an appropriate concentration respectively of sodium carbonate and sodium bicarbonate to avoid cocrystallization of sodium sesquicarbonate crystals in the sodium carbonate monohydrate crystallizer upon recycling of at least a portion of the stripped diluted mother liquor to the sodium carbonate monohydrate crystallizer.

7. The process of claim 1, wherein stripping carbon dioxide from at least a portion of the mother liquor comprises:

removing a portion of the slurry from the sodium carbonate monohydrate crystallizer; and separating at least a portion of the mother liquor from the removed slurry.

8. A process for producing sodium carbonate monohydrate crystals, comprising:

feeding a solution mined brine containing at least sodium bicarbonate to a sodium carbonate monohydrate crystallizer;

evaporating water from the solution mined brine to produce a slurry comprising sodium carbonate monohydrate crystals and a mother liquor containing dissolved sodium carbonate and sodium bicarbonate;

removing a portion of the mother liquor from the sodium carbonate monohydrate crystallizer and diluting the removed portion of the mother liquor with an aqueous diluent to form a diluted mother liquor;

stripping carbon dioxide from the diluted mother liquor in a stream-fed stripping device to decompose sodium bicarbonate in the diluted mother liquor to water, sodium carbonate and carbon dioxide; and recycling at least a portion of the stripped diluted mother liquor to the sodium carbonate monohydrate crystallizer.

9. The process of claim 8, wherein the solution mined brine is derived from solution mining trona.

10. The process of claim 8, wherein the solution mined brine is derived from solution mining nahcolite.

11. The process of claim 8, wherein removing a portion of the mother liquor from the sodium carbonate monohydrate crystallizer comprises removing sodium carbonate monohydrate crystal-free mother liquor from the sodium carbonate monohydrate crystallizer.

12. The process of claim 8, wherein removing a portion of the mother liquor from the sodium carbonate monohydrate crystallizer comprises:

removing at least a portion of the slurry from the sodium carbonate monohydrate crystallizer; and separating at least a portion of the mother liquor in the slurry from the sodium carbonate monohydrate crystals in the slurry.

13. The process of claim 12, wherein the separated sodium carbonate monohydrate crystals are processed into soda ash.

14. The process of claim 8, wherein the diluent is solution mined brine.

15. The process of claim 8, wherein the stripping device is a countercurrent stripping column.

16. The process of claim 8, wherein recycling at least a portion of the stripped diluted mother liquor to the sodium carbonate monohydrate crystallizer comprises recycling enough stripped diluted mother liquor to maintain a sodium bicarbonate concentration of the mother liquor in the sodium carbonate monohydrate crystallizer at a level no greater than an invariant point for the sodium carbonate monohydrate crystallizer.

17. A process for producing sodium carbonate monohydrate crystals, comprising:

feeding a solution having a sodium bicarbonate concentration of at least 1 weight percent to a sodium carbonate monohydrate crystallizer;

crystallizing sodium carbonate monohydrate crystals from the solution to form a slurry comprising sodium carbonate monohydrate crystals and a mother liquor containing dissolved sodium carbonate and sodium bicarbonate;

removing a portion of the mother liquor from the sodium carbonate monohydrate crystallizer;

diluting the removed portion of the mother liquor to form a diluted mother liquor;

feeding the diluted mother liquor to a countercurrent stripping column;

stripping carbon dioxide from the diluted mother liquor fed to the countercurrent stripping column to form a stripped mother liquor; and recycling at least a portion of the stripped mother liquor to the sodium carbonate monohydrate crystallizer.

18. The process of claim 17, wherein diluting the removed portion of mother liquor comprises diluting the removed portion of mother liquor with a solution mined brine.

* * * * *